United States Patent
Sun et al.

(10) Patent No.: US 8,595,138 B2
(45) Date of Patent: Nov. 26, 2013

(54) PACKAGING SYSTEM FOR CUSTOMIZING SOFTWARE

(75) Inventors: Wenchao Sun, San Jose, CA (US); Jian-Ping Shi, Santa Clara, CA (US); Chandra P. Patni, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 228 days.

(21) Appl. No.: 12/877,273

(22) Filed: Sep. 8, 2010

(65) Prior Publication Data

US 2010/0333078 A1 Dec. 30, 2010

Related U.S. Application Data

(63) Continuation of application No. 10/441,698, filed on May 20, 2003, now Pat. No. 7,814,477.

(51) Int. Cl.
*G06Q 99/00* (2006.01)

(52) U.S. Cl.
USPC .............................................. 705/51; 726/26

(58) Field of Classification Search
USPC .............................................. 705/51; 726/26
See application file for complete search history.

(56) References Cited

U.S. PATENT DOCUMENTS

| | | | |
|---|---|---|---|
| 5,892,900 A * | 4/1999 | Ginter et al. | 726/26 |
| 6,158,049 A | 12/2000 | Goodwin et al. | |
| 6,317,868 B1 | 11/2001 | Grimm et al. | |
| 6,385,766 B1 | 5/2002 | Doran et al. | |
| 6,754,888 B1 | 6/2004 | Dryfoos et al. | |
| 6,865,736 B2 | 3/2005 | Holmberg et al. | |
| 7,784,044 B2 * | 8/2010 | Buban et al. | 717/168 |
| 2002/0199179 A1 | 12/2002 | Lavery et al. | |
| 2003/0046676 A1 | 3/2003 | Cheng et al. | |
| 2003/0056201 A1 | 3/2003 | Degenaro et al. | |
| 2004/0093595 A1 | 5/2004 | Bilange | |
| 2004/0107416 A1 * | 6/2004 | Buban et al. | 717/170 |
| 2006/0161891 A1 | 7/2006 | Ehnebuske et al. | |

* cited by examiner

*Primary Examiner* — James D Nigh
(74) *Attorney, Agent, or Firm* — Kraguljac Law Group, LLC

(57) ABSTRACT

In one embodiment, a system for customizing executable software code is provided. The system can include a scan logic configured to scan the executable software code to determine an execution trigger point in the executable software code. A packager logic can be configured to alter the execution trigger point by embedding, into the executable software code, alternative code configured to cause a customized logic to execute at the execution trigger point.

19 Claims, 4 Drawing Sheets

PACKAGING SYSTEM FOR CUSTOMIZING SOFTWARE

CROSS REFERENCE TO RELATED APPLICATION

This is a continuation of U.S. patent application entitled "Packaging System for Customizing Software", Ser. No. 10/441,698; filed May 20, 2003 now U.S. Pat. No. 7,814,477, inventor Sun et al., which is also assigned to the present assignee.

BACKGROUND

Certain types of software applications are developed by software developers (e.g. content provider) and distributed to one or more content brokers (e.g. Operators) who then distribute the software to their customers. An operator, for example, operates one or more websites that contain catalogs of available software that can be selected and downloaded by users. Downloaded software can then be installed and executed on a user's device such as a computer, cell phone, portable computer, hand-held devices, and others. Typically, each operator desires to control usage of the software by users. To control the usage of a software application, Digital Rights Management (DRM) logic can be programmed into the software application to define selected rules and usage rights for how the software, or other digital media object, can be used after it has been downloaded or otherwise delivered to a device. Examples of usage rights can be try-and-buy preview rights, user subscription base usage control rights, forward locking rules, and other types of rules and rights. Although the software application (e.g. a chess game) is developed generically, meaning, developed to be used for any user, each particular operator that distributes the software application potentially desires customized logic to be included within the software to control desired Digital Rights Management or other customized functions.

In prior systems, each operator desiring customized logic would request the software developer to reprogram the software for their specific needs. This created software management challenges since a software developer might have to create, maintain, test, and update numerous versions of one software application where each version is customized for a particular operator. In some situations, testing of customized software would be difficult since the software developer may not have access to actual users using the software. Thus, the software developer would not have a real-time environment to accurately test the functionality of the customized logic.

The present invention provides a new and useful method and system of customizing software.

BRIEF DESCRIPTION OF THE DRAWINGS

In the accompanying drawings which are incorporated in and constitute a part of the specification, embodiments of a system and method are illustrated which, together with the detailed description given below, serve to describe the example embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vise versa.

DETAILED DESCRIPTION OF ILLUSTRATED EMBODIMENTS

Figure 1:
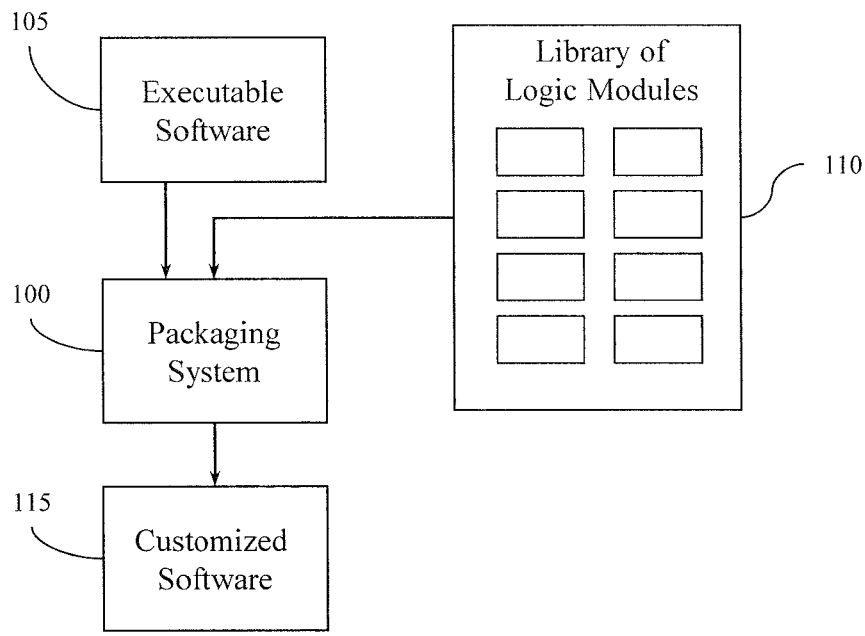
FIG. 1 illustrates one embodiment of a packaging system.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to any non-transitory medium that participates in directly or indirectly providing signals, instructions and/or data to one or more processors for execution. Such a medium may take many forms, including but not limited to, non-volatile media, and volatile media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or cartridge, or any other medium from which a computer, a processor or other electronic device can read.

"Logic", as used herein, includes but is not limited to hardware, firmware, instructions stored on a non-transitory medium and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmable/programmed logic device, memory device containing instructions, or the like.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that are stored in a non-transitory computer readable medium that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

"User", as used herein, includes but is not limited to one or more persons, software, computers or other devices, or combinations of these.

In one embodiment, a packaging system is provided for combining executable software with customized logic so that the executable software can be re-configured to perform desired functions. One scenario where the packaging system can be used is where two software operators distribute the same executable software (e.g. a chess game) to customers/users. But, each operator desires to provide the software to its customers with different rules. For example, operator one may want the software to be accessible to its users for only a limited time after downloading. Operator two may want the software to only be accessible by a user if the user keeps a monthly subscription paid up to date.

In one embodiment, the packaging system can be dynamically configured to embed custom logic into the executable code of the software so that re-programming of source code and re-compiling of the software can be avoided. A library of custom logic modules can be maintained where each module provides a desired digital rights management function that provides particular usage rights to a selected software application or even to a selected user that can be dynamically embedded into the selected software application. The custom logic may also be configured to provide other desired functions to a software application such as displaying special banners, marketing campaign messages or other notices specific to the operator providing the software application. With the packaging system, an operator can modify software without having to go back to a software developer to reprogram the software code.

Illustrated in FIG. 1 is one embodiment of a packaging system 100 configured to customize executable software 105 (also referred to herein as software, executable code, or application). The packaging system 100 is configured to modify the executable software 105 with customized code that can, for example, be selected from a library of logic modules 110. It will be appreciated that the library 110 may include multiple locations. Each logic module can be configured to perform one or more desired functions such as controlling usage and/or access rights to the executable software 105. These types of functions are generally referred to as digital rights management (DRM) functions.

In one embodiment, the logic modules 110 are in an executable form such that the packaging system 100 can combine executable code of the software 105 and executable code of a selected logic module 110. Once combined, a customized software application 115 is generated. In this manner, before the executable software 105 is transmitted to a customer or user, the software 105 can be dynamically customized with desired functions and downloaded as the customized software 115.

The executable software 105 and logic modules 110 can be based on any desired programming language. For purposes of explanation, the system will be described with respect to a Java-based environment where the executable software 105 is a MIDlet application configured to run on a mobile information device profile (MIDP) device. Examples of MIDP devices include cellular phones, pocket PCs, palm pilots, pagers, Blackberry devices, or other devices that can support J2ME. These types of devices typically have resource constrained environments and have limited computational power and storage capacity as compared to a standard computer system. Of course, the software can be configured to operate on any desired device.

If the software 105 and logic modules 110 are developed using Java, their compiled form includes machine independent byte code. In one embodiment, the packaging system 100 can be configured to inspect the byte code of the executable software 105 to determine where a selected logic module can be embedded. For example, the packaging system 100 can search for application program interface (API) points such as entry points and exit points of the software. These points are also referred to herein as trigger points. The API points can affect an execution path of the software 105 and indicate life cycle methods that change the state of the software during execution.

Example states include an active/running state, a paused state, and a destroyed state. Based on current Java protocols, the active state is initiated with a "startApp( )" method, the paused state is initiated by a "pauseApp( )" method, and the destroyed state is initiated by a "destroyApp(boolean b)" method. Thus, an entry point of the executable software 105 is where the "startAppQ" appears in the byte code and an exit point would be where the "destroyApp(boolean b)" appears in the byte code. Thus, the packaging system 100 can be configured to located these methods in the byte code. Of course, other programming languages will have different code that initiates state changes, in which case, the packaging system 100 can be configured to locate the appropriate code.

In a case where a selected logic module from library 110 is a digital rights management (DRM) object for controlling usage and/or access rights, the DRM logic module would be embedded where the "startApp( )" appears in order to execute the DRM logic module before the original software executes. The logic module can be configured to receive notifications of life cycle methods of the software 105 based on selected entry points and/or exit points in the software 105. The customized DRM object can then be configured to act on the received notifications and decide if the software 105 should resume or terminate its execution based on desired access conditions. For example, if a user satisfies required access conditions for using the software, such as paying a subscription fee, then the DRM logic module would continue execution of the software 115 thus allowing access to the user.

By way of another example, suppose the executable software 105 is to be offered to users free of charge for a one-week trial period. Once the trial period expires, the executable software 105 should no longer be accessible unless the user pays for the software. Further suppose that a custom logic has been previously generated and has been configured to determine whether a one-week period has expired or not. Accordingly, the custom logic would be embedded into the executable software 105 by the packaging system 100 so that access to the executable software 105 is controlled. As such, an execution path of the software 105 would be modified to cause the custom logic to initially execute before the software 105 is executed. In this manner, operators can easily apply custom features to a software application based on their specific needs rather than having to re-program the source code of the software.

As described above, an entry point of the software 105 can be intercepted in the byte code and alternative code can be inserted that calls or otherwise executes a selected custom logic. Thus, when the customized software 115 is executed, the custom logic will be caused to first execute to determine whether access is permitted prior to executing the original entry point for the software. The packaging system 100 can also configure the custom logic to control how the execution path returns to the software 115. For example, if the user's trial period has not yet expired, the custom logic will return execution back to the entry point of the software 115. If the trial period has expired, the custom logic can be programmed to call an exit point of the software 115 to terminate its execution. A more detailed example of how custom logic can be embedded into executable code is shown in FIG. 2.

Figure 2:
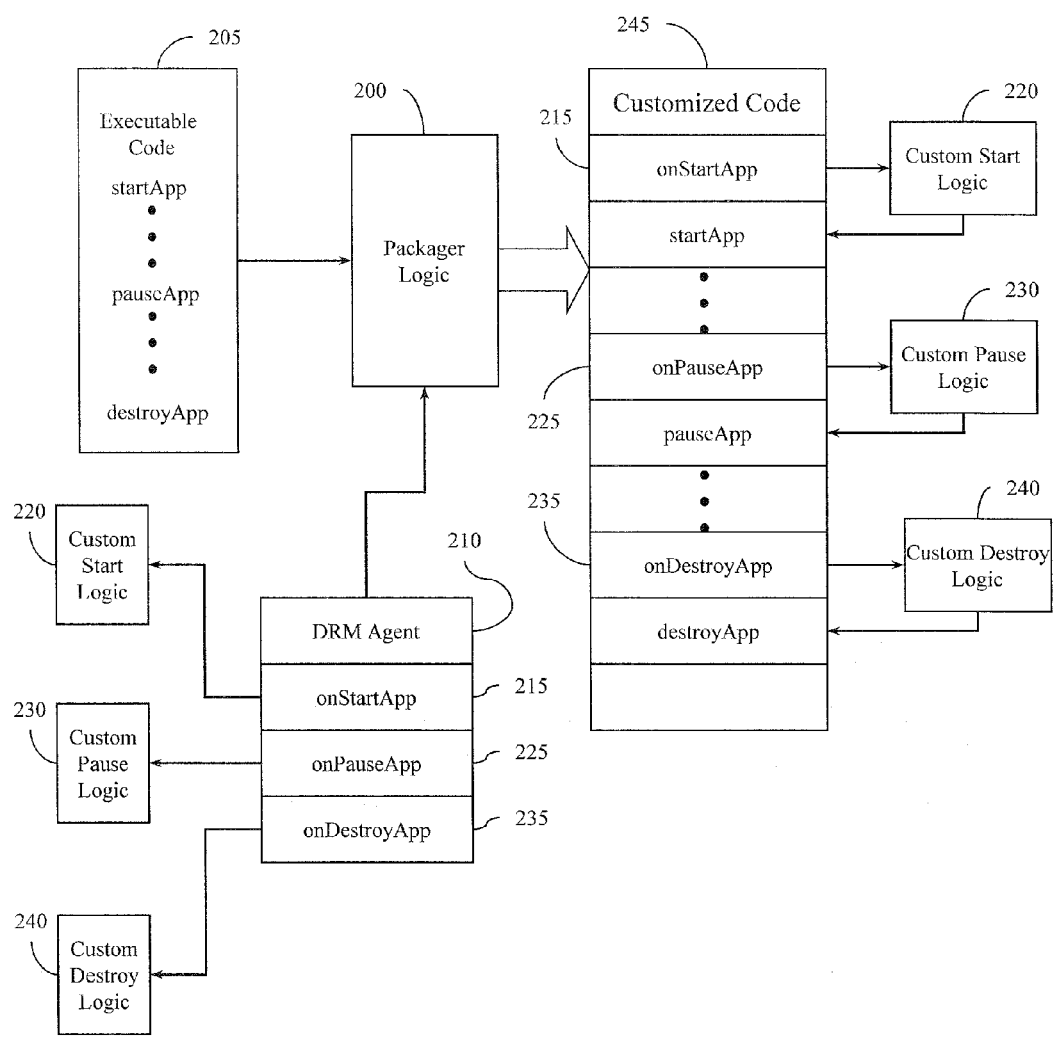
FIG. 2 illustrates another embodiment of a software packaging system.

Illustrated in FIG. 2 is one embodiment of a packager logic 200 that is configured to add customized digital rights management logic to a software application which is in a form of executable code 205. In one embodiment, the executable code 205 can be a Java class that has been previously compiled into byte code. A "Java Class", as used herein, can include but is not limited to a translated format of Java Programs or compilation units of machine-independent byte code. Likewise, each custom logic can be a Java class in the form of byte code. In this form, the executable code 205 will include life cycle methods representing entry points and exit points during execution of the code 205. As described previously, the entry/exit points include byte code corresponding to "startApp", "pauseApp", and "destroyApp". In another embodiment, the executable code 205 can have a form of a machine-dependent code.

The packager logic 200 can be configured to allow an operator to select custom logic to be executed at a desired entry and/or exit point. In that regard, a digital rights management (DRM) agent 210 can be generated that defines how the executable code 205 should be modified and associates selected custom logic to a selected entry/end point. For example, the DRM agent 210 can define that at the entry point associated with "startApp", an alternative code is to be embedded that executes "on StartApp" 215 that initiates a custom start logic 220. Likewise, other entry/exit points can be defined. For example, a method "on PauseApp" 225 can be defined to initiate a custom pause logic 230 that is executed prior to the "pauseApp" code in the executable code 205. Also, an "on DestroyApp" method 235 can be defined to initiate a custom destroy logic 240 and embedded in the executable code 205 prior to the "destroyApp" method in the executable code 205. It will be appreciated that the alternate code can be embedded in other desired manners with respect to their associated entry/exit point such as being executed prior to, in place of, or after their associated entry/exit point.

With the definitions from the DRM agent 210, the packager logic 200 includes logic to modify the executable code 205 and generate a customized code 245 that is ultimately transmitted to a user. The customized code 245 is illustrated in FIG. 2 with an example logical representation of how an execution path of the customized code 245 can be modified with the embedded custom logic. For example, the entry/exit points "startApp", "pauseApp", and "destroyApp" have selected to be customized with alternative code "on startApp" 215, "on pauseApp" 225, and "on destroyApp" 235. Each of the alternative code has been configured to initiate its corresponding custom logic. It will be appreciated that the alternative code is not necessarily embedded adjacent to its associated entry point in the byte code. Rather, the byte code of the customized code 245 can be modified such that the address of "startApp" is assigned to "on startApp" 215 which then continues the execution path to the custom start logic 220. The custom start logic 220, depending on its configuration, can return execution to "startApp" and resume execution or, terminate the execution if access to the software is not permitted.

In this manner, the packager logic 200 can change byte code addresses to customize what happens during execution of the customized code 245 based on selected triggering events such as start, pause, and/or destroy. Since the customized logic that is embedded in the executable code 245 is defined in pre-verified class files in the form of byte codes, the packager logic 200 can modify the executable code 205 dynamically without having to re-compile the code. Thus in one embodiment, the packager logic 200 is configured to combine a pre-verified class file (e.g. a software application) with other pre-verified class files (e.g. custom logic modules). It will be appreciated that when moving and/or changing byte code, care should be taken not to destroy the integrity of the class file.

Preverification is a phase in the development and deployment cycle for Java applications designed to run on a J2ME Connected Limited Device Configuration (CLDC). For example, preverification performs certain checks on byte codes ahead of runtime. If this first verification check is passed, a preverifier can annotate the class files using, for example, Java byte code attributes, and then saves the annotated class files or passes the files along to the next tool in the compile chain. Using byte code attributes can allow the class files to be executable in a byte code interpreter, such as a virtual machine, that is not aware of the benefits of preverification.

When a byte code interpreter, such as a K virtual machine (KVM), attempts to run execute a J2ME CLDC-based application, it checks the Java class files for preverification annotations. Proper annotations in the class files guarantee that certain compile-time checks were made, and so the byte code interpreter can pass through its own verification and security checks much faster and start executing the application more quickly.

Figure 3:
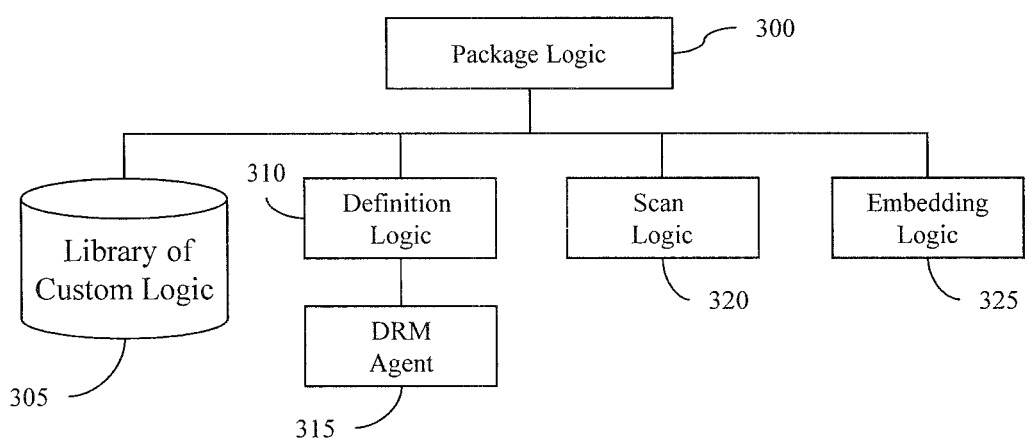
FIG. 3 shows another embodiment of a packager logic.

With reference to FIG. 3, another embodiment of a packager logic 300 is shown. The packager logic 300 is configured to package a selected software application with logic designed to apply or enforce selected rules that an operator wishes to apply to the software application. The packaged logic 300 can, for example, control usage of the software, add functionality, or other desired features. A library of custom logic 305 can be made available to the packager logic 300 from which an operator can select. Thus, one generic software application can be distributed to many operators and the packager logic 300 can be used to customize that generic software application.

Examples of custom logic may include logic that controls a monthly subscription for an application and cancels access to the application if the subscription is not paid. Another logic module can be configured to advertise different promotional items or prices to a user during the execution of the application. Each custom logic 310 can be specifically generated for an operator's particular needs which may be different from other operator's needs. Of course, the custom logic 310 may also include non-unique logic that performs a desired function. In one embodiment, logic from the custom logic 310 can be translated into Java classes in a form of byte code.

The packager logic 300 can include a definition logic 310 configured to identify which software is to be packaged with which selected custom logic. The definition logic 310 can include a graphical interface that receives instructions from an operator/user to make these identifications manually. The identifications can also be made programmatically based on predetermined rules. The rules can be based on one or more conditions such as which user desires to download a particular software application, a current subscription status of the user, other user properties or, other desired conditions. For example, one desired condition can be that all software applications downloaded during a particular time period will be free for a trial period. In such case, the definition logic 310 can be programmed to automatically combine a selected custom logic to every software application transmitted to a user such that access to the application is limited for a trial period only.

With further reference to FIG. 3, the definition logic 310, in one embodiment, can be configured to apply digital rights management (DRM) logic to a software application to control a user's access and usage rights to the software. In that regard, a DRM agent 315 can be generated to define what custom logic is to be executed at desired triggering points in the software. One embodiment of the DRM agent 315 is shown in FIG. 2 as agent 210. Of course, a similar component can be used to define other types of custom logic besides digital rights management logic. Once custom logic has been associated with selected triggering points (e.g. entry points and exit points), a scan logic 320 inspects the executable code of the software application to identify the location of the selected triggering points.

In one embodiment, the scan logic 320 is configured to scan byte code and determine the addresses for the triggering points that are defined by the DRM agent 315. As discussed previously, example triggering points include life cycle methods "startApp", "pauseApp", and "destroyApp". The addresses can then be shifted or replaced by alternate code corresponding to the custom logic selected. The alternate code can be embedded into the byte code by an embedding logic 325. For example, the embedding logic 325 can be configured to insert alternative byte code and to change addresses in a software application. In this manner, the execution path of the software application can be modified and redirected to perform the custom logic being applied to the software application. The software application can then be downloaded or otherwise transmitted to a user.

Figure 4:
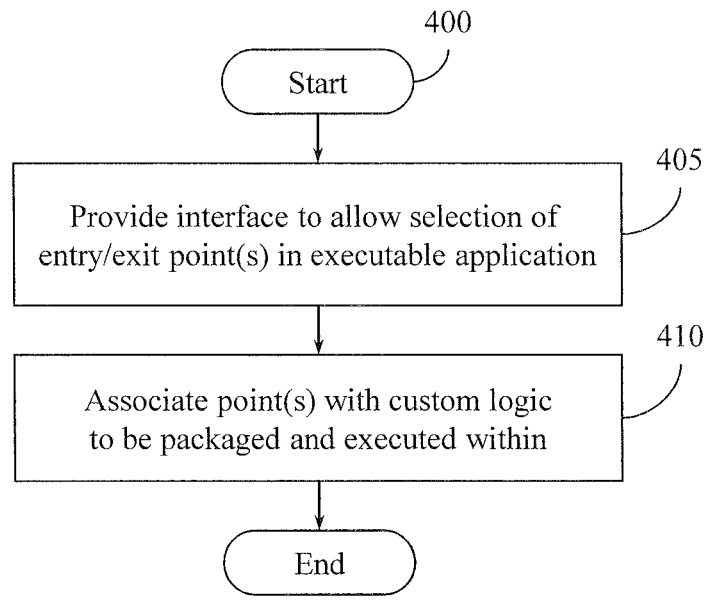
FIG. 4 shows one embodiment of a methodology for generating a reconfiguration agent.

Illustrated in FIG. 4 is one embodiment of a methodology 400 for defining an agent module that can be used by a packager logic to modify a software application with custom logic. An example agent module can be the DRM agent 210 shown in FIG. 2. The illustrated elements denote "processing blocks" and represent computer software instructions or groups of instructions that cause a computer to perform functions, actions, and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented, functional and/or artificial intelligence techniques. The foregoing applies to all methodologies described herein.

With reference to FIG. 4, upon initiating the process, an interface can be provided that allows an operator to identify original content (e.g. an executable software application) to be packaged with custom logic (Block 405). This may include allowing for selection of one or more triggering points in the executable software where the custom logic is to be applied. As previously described, a triggering point can include an entry/exit point into a state such as where the software starts, pauses, or terminates. In an alternative embodiment, the identification of the original content and the triggering points can be programmatically determined. For each triggering point, a custom logic can be selected and associated with a triggering point (Block 410). The identification and selection can be determined by receiving instructions from an operator, programmatically, or a combination of both. Once the definitions have been generated, the selected software can be reconfigured to include the custom logic, for example, in a manner as shown in FIG. 5.

Figure 5:
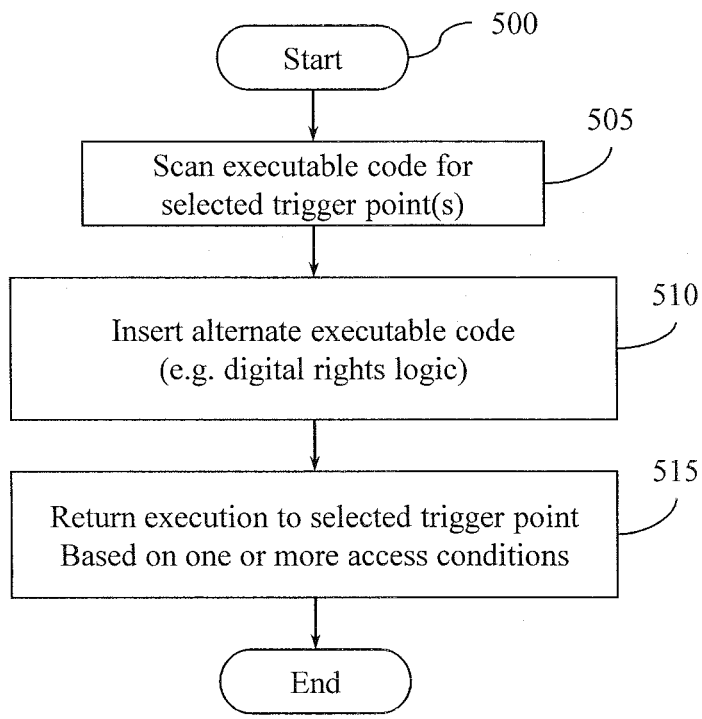
FIG. 5 illustrates one embodiment of a methodology for embedding custom logic into a software application.

Illustrated in FIG. 5 is one example of a methodology 500 for packaging an executable software application with custom logic. Based on predefined triggering points, the executable code of the software application is scanned to locate the triggering points (e.g. entry point(s), exit point(s)) (Block 505). Upon locating a triggering point, its address can then be determined. Alternate executable code can then be inserted into the software application and assigned the address corresponding to the triggering point (Block 510). For example, the alternate executable code represents code that executes the custom logic to be applied to the triggering point.

In one embodiment, the address of a triggering point is shifted or reassigned such that an execution path of the software performs the custom logic. One example of custom logic can include digital rights logic that can be configured to control access and/or usage of the software. Once the triggering points are determined, the custom logic can be reconfigured to return execution to a triggering point based on one or more conditions (Block 515). Depending on the function of the custom logic, execution of the software can continue as normal, can terminate to prohibit access, or can branch to another portion of the executable code. Thus, the executable software application can be reconfigured with custom logic by redirecting addresses in the byte code of the executable software to perform the custom logic without having to recompile the software.

Figure 6:
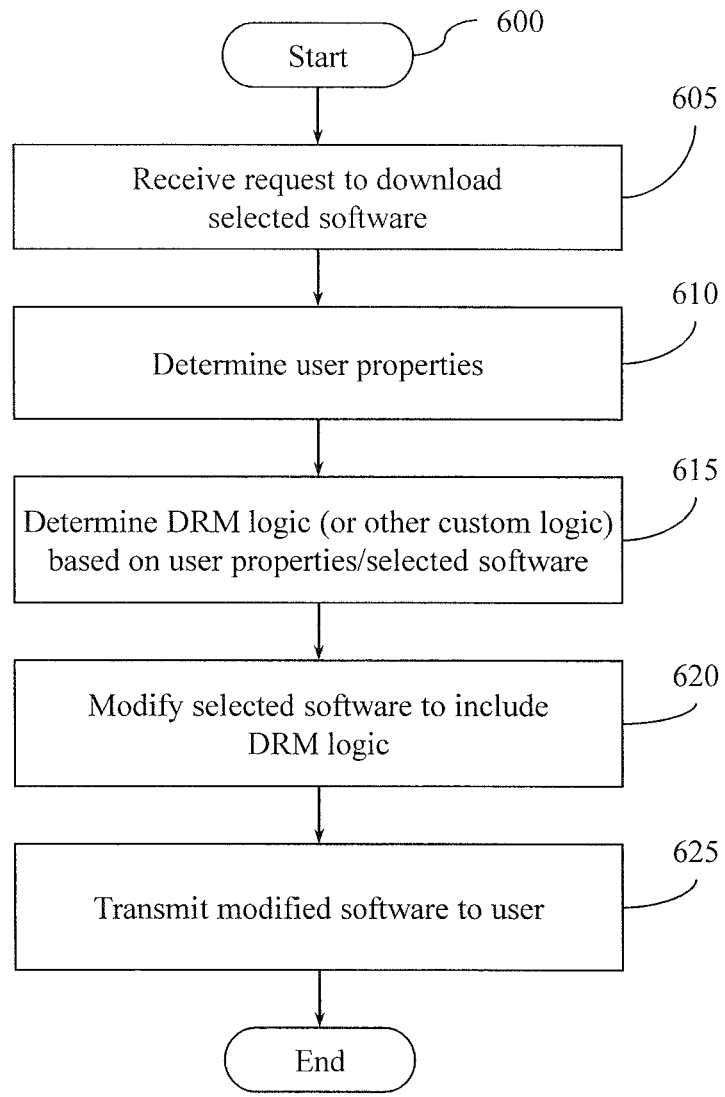
FIG. 6 illustrates one embodiment of a methodology for dynamically reconfiguring software with custom logic.

Illustrated in FIG. 6 is one embodiment of a methodology 600 to dynamically package a software application with selected digital rights logic. The methodology will be described with reference to a network environment where one or more software applications are made available to users by downloading over a network, such as the Internet. For example, a user may access a web site controlled by an operator that provides software. The user would select desired software for download. When a request is received to download a selected software (Block 605), user properties or other factors that may affect which digital rights to use can be determined (Block 610). This determination can be optional depending on requirements desired by the operator who is distributing the software. For example, the same digital rights logic can be applied to a selected software application regardless of the user properties.

If specific factors are to be used, an appropriate digital rights management logic can be determined based on the specific user properties and/or based on the software selected (Block 615). The selected software can then be modified with the appropriate digital rights logic (Block 620). As previously described, byte code from the software application can be inspected for entry/exit points. Alternate byte code can then be embedded or otherwise incorporated into the original byte code. Addresses can be modified to include the digital rights logic within the execution path of the software application. Thus, when the software application is executed by a user, the digital rights logic can be executed first to determine whether access is permissible or to perform other desired functions. Once the selected software has been reconfigured, it can be transmitted to the user (Block 625).

With the various embodiments described above, the software can be better managed by being able to apply custom requirements to software. Reconfiguring of software can be performed in a flexible manner without having to reprogram corresponding source code, which in some cases may not be available. It will be appreciated that the present systems and methods can be applied in a variety of environments and with a variety of software types. For example, the software and custom logic may be Java-based software such as J2ME applications, J2EE applications, or other desired software types.

Suitable software for implementing the various components of the present system and method using the teachings presented here include programming languages and tools such as Java, C#, HTML, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and, maintained or distributed as part of a computer-readable medium as defined previously. Another form of the software may include signals that transmit program code of the software to a recipient over a network or other communication medium. It will be appreciated that components described herein may be implemented as separate components or may be combined together.

It will be appreciated that the term "custom" used with logic or software throughout the disclosure is generally used to represent a logic or software that is selected to be embedded or otherwise used to customize another software. Thus, the custom logic may not necessarily be unique logic or software. For example, the logic modules 110, custom start logic 220, the library of custom logic 305, and the like, may include unique logic specially configured for a user, non-unique logic obtained from a third party, other types of logic, and combinations of these.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A computer-implemented method, the method comprising:

selecting, by at least a processor, an execution trigger point within an executable software code that is stored in a non-transitory computer readable medium using a computing device configured to allow operator selection of executable custom code;

locating, by at least the processor, code within the executable software code corresponding to the execution trigger point;

altering, by at least the processor without having to recompile the executable software code, the execution trigger point by embedding, before the execution trigger point, digital rights code into the executable software code in the non-transitory computer readable medium such that an execution path of the executable software code is modified to execute the digital rights code when execution reaches the digital rights code, where the digital rights code is configured to control access to the executable software code; and modifying, by at least the processor, the digital rights code in the non-transitory computer readable medium to control access to the executable software code by deciding if the executable software code should execute or terminate based on access conditions that are determined when the executable software code is executed, wherein:

if the digital rights code decides that the executable software code is to execute, then the digital rights code returns execution to the execution trigger point; and if the digital rights code decides that the executable software code is to terminate, then the digital rights code terminates the execution of the executable software code.

2. The method as set forth in claim 1 wherein the selecting the execution trigger point includes selecting at least one of a start application point, a pause application point, or a terminate application point.

3. The method as set forth in claim 1 where the embedding comprises reassigning an address associated with the execution trigger point in the executable software code to an address of the digital rights code.

4. The method as set forth in claim 1 further including:

providing one or more executable applications for selection;

receiving a selection from an operator; and upon receiving the selection of one executable application from the operator, dynamically embedding a selected digital rights code into the executable software code based on properties of a user prior to transmitting the executable software code to the user.

5. The method as set forth in claim 1 wherein embedding the digital rights code into the executable software code adds the digital rights code without replacing existing code in the executable software code.

6. The method as set forth in claim 1 wherein the digital rights code, when executed during execution of the executable software code, prohibits continued execution of the executable software code after the executable software code is executing based on one or more properties.

7. The method as set forth in claim 1 where the digital rights code is configured to perform a subscription fee determination that controls execution of the executable software code based on at least whether a subscription fee has been paid.

8. A system for customizing executable software code, the system comprising:

a processor;

a non-transitory computer-readable medium including stored instructions that when executed by the processor:

scan the executable software code for a location of a selected execution trigger point in the executable software code;

alter the execution trigger point based on at least the location of the execution trigger point by embedding, into the executable software code, alternative code configured to cause a selected executable custom code to execute prior to the execution trigger point, where the alternative code alters the execution of the executable software code and controls access to the executable software code using the selected executable custom code;

reconfigure the selected executable custom code to control access to the executable software code by deciding, during execution of the executable software code, if the executable software code should continue to execute or terminate based on access conditions that are determined when the selected executable custom code is executed from within the executable software code, wherein:

if the selected executable custom code decides that the executable software code is to continue to execute, then the selected executable custom code returns execution to the execution trigger point; and if the selected executable custom code decides that the executable software code is to terminate, then the selected executable custom code terminates the execution of the executable software code.

9. The system of claim 8 wherein the execution trigger point includes a start point, a pause point or, a termination point in the executable software code.

10. The system of claim 8 wherein the alternative code includes byte code.

11. The system of claim 8 wherein the non-transitory computer-readable medium further including stored instructions to dynamically customize the executable software code for a selected client prior to the executable software code being downloaded to the selected client.

12. The system of claim 8 wherein the executable custom code includes digital rights configured to control access rights to the executable software code.

13. The system of claim 8 wherein the executable custom code is translated into classes having a form of byte code.

14. A non-transitory computer-readable medium having instructions stored therein, which when executed cause a computer to perform a method, the method comprising:

scanning, by at least a processor in the computer, an executable software code to locate a selected execution trigger point in the executable software code; and altering, by at least the processor, the execution trigger point based on at least the location of the selected execution trigger point by embedding, into the executable software code, alternative executable code configured to cause a selected executable custom logic to execute prior to the execution trigger point, where the selected executable custom logic includes digital rights configured to control access rights to the executable software code during execution of the executable software code;

modifying, by at least the processor, the digital rights to control access to the executable software code by deciding, during execution of the executable software code, if the executable software code should continue to execute or terminate based on whether a predetermined condition is met that is determined when the executable software code is executed, wherein:

if the digital rights decides that the executable software code is to execute, then the digital rights returns execution to the execution trigger point; and if the digital rights decides that the executable software code is to terminate, then the digital rights terminates the execution of the executable software code.

15. The non-transitory computer-readable medium of claim 14 further comprising modifying the executable software code to return execution to the execution trigger point based on the predetermined condition being access rights of a user.

16. The non-transitory computer-readable medium of claim 14, comprising using a graphical user interface to allow a user to select the selected execution trigger point.

17. The non-transitory computer-readable medium of claim 14, further comprising locating a plurality of selected execution trigger points in the executable software code.

18. The non-transitory computer-readable medium of claim 14, wherein the alternative executable code includes instructions for changing execution of the executable software from the selected execution trigger point to execute the selected executable custom logic.

19. The non-transitory computer-readable medium of claim 14, where the digital rights implement a subscription fee determination that controls execution of the executable software code based at least in part on the predetermined condition, where the predetermined condition includes whether a predetermined subscription fee has been paid by a user.

* * * * *

UNITED STATES PATENT AND TRADEMARK OFFICE
CERTIFICATE OF CORRECTION

| | | |
|---|---|---|
| PATENT NO. | : 8,595,138 B2 | Page 1 of 1 |
| APPLICATION NO. | : 12/877273 | |
| DATED | : November 26, 2013 | |
| INVENTOR(S) | : Sun et al. | |

It is certified that error appears in the above-identified patent and that said Letters Patent is hereby corrected as shown below:

In the Specification

In column 1, line 67, delete "vise versa." and insert -- vice versa. --, therefor.

In column 4, line 19, delete "startAppQ" and insert -- startApp( ) --, therefor.

In column 4, line 22, delete "located" and insert -- locate --, therefor.

In column 5, line 29, delete "on StartApp" and insert -- onStartApp --, therefor.

In column 5, line 31, delete "on PauseApp" and insert -- onPauseApp --, therefor.

In column 5, line 34, delete "on DestroyApp" and insert -- onDestroyApp --, therefor.

In column 5, line 49, delete "on StartApp" and insert -- onStartApp --, therefor.

In column 5, line 50, delete "on PauseApp" and insert -- onPauseApp --, therefor.

In column 5, line 50, delete "on DestroyApp" and insert -- onDestroyApp --, therefor.

In column 5, line 56, delete "on StartApp" and insert -- onStartApp --, therefor.

Signed and Sealed this
Third Day of June, 2014

Michelle K. Lee
*Deputy Director of the United States Patent and Trademark Office*